United States Patent
Sekinishi et al.

(12)

(10) Patent No.: US 6,298,237 B1
(45) Date of Patent: Oct. 2, 2001

(54) RADIO SWITCHING EQUIPMENT PERMITTING A PLURALITY OF MOBILE TERMINALS TO USE ONE TRUNK CIRCUIT AND A CIRCUIT CONTROL METHOD FOR RADIO SWITCHING EQUIPMENT

(75) Inventors: Akira Sekinishi; Takanobu Ihara, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/195,308

(22) Filed: Nov. 18, 1998

(30) Foreign Application Priority Data

Nov. 19, 1997 (JP) .................................................. 9-318450

(51) Int. Cl.⁷ .............................. H04M 1/00; H04B 7/00
(52) U.S. Cl. ........................ 455/445; 455/412; 455/418; 455/422; 455/426; 455/520; 370/311; 379/219
(58) Field of Search ................................... 455/520, 524, 455/525, 560, 445, 435, 412, 418, 561, 422, 426; 370/311, 342; 379/219

(56) References Cited

U.S. PATENT DOCUMENTS

| | | | |
|---|---|---|---|
| 3,562,431 | * 2/1971 | Inose et al. | 455/520 |
| 3,898,390 | * 8/1975 | Wells et al. | 455/520 |
| 4,680,786 | * 7/1987 | Baker et al. | 379/60 |
| 5,212,724 | * 5/1993 | Nazarenko et al. | 455/520 |
| 5,365,512 | * 11/1994 | Combs et al. | 455/520 |
| 5,377,185 | * 12/1994 | Bardusk | 455/520 |
| 5,603,086 | * 2/1997 | Cree et al. | 455/520 |
| 5,650,995 | * 7/1997 | Kent | 455/508 |
| 5,956,648 | * 9/1999 | Brennan et al. | 455/518 |
| 5,987,331 | * 11/1999 | Grube et al. | 455/519 |
| 6,021,326 | * 2/2000 | Nguyen | 455/520 |

FOREIGN PATENT DOCUMENTS

| | | |
|---|---|---|
| 62-64192 | 3/1987 | (JP) . |
| 1-215137 | 8/1989 | (JP) . |
| 7-297918 | 11/1995 | (JP) . |
| 7-307797 | 11/1995 | (JP) . |
| 9-224080 | 8/1997 | (JP) . |

OTHER PUBLICATIONS

Japanese Office Action issued Nov. 2, 1999 in a related application along with an English translation of the relevant portions.

* cited by examiner

Primary Examiner—Lee Nguyen
Assistant Examiner—Simon Nguyen
(74) Attorney, Agent, or Firm—Ostrolenk, Faber, Gerb & Soffen, LLP (57) ABSTRACT

A radio switching equipment includes circuit correspondence storage portion for storing a plurality of mobile terminal numbers with respective correspondence with a circuit number of each trunk circuit, circuit control portion for reading out the mobile terminal number corresponding to the circuit number of the trunk circuit or reading out the circuit number of the trunk circuit corresponding to the mobile terminal number, on the basis of a storage content of the circuit correspondence storage portion when call is received from the trunk circuit or when call is made from the mobile terminal, and requesting call processing, call processing portion for receiving the request of the call processing from the circuit control portion and establishing connection between the mobile terminal identified by the mobile terminal number and the trunk circuit identified by the circuit number, and varying portion for varying correspondence between the circuit number of the trunk circuit and the mobile terminal number of the mobile terminal through which a demand for variation is requested, in the circuit correspondence storage portion, in response to the demand for variation from the mobile terminal.

26 Claims, 7 Drawing Sheets

```
START
  ↓
READ OUT CORRESPONDING
TRUNK CIRCUIT FROM           ~ 501
MOBILE TERMINAL NUMBER
  ↓
TRANSMIT FROM
RELEVANT TRUNK CIRCUIT        ~ 502
  ↓
END
```

FIG. 7

| MOBILE TERMINAL NUMBER | REWRITING PERMITTED/ NOT PERMITTED |
|---|---|
| 1000 | PERMITTED |
| 2000 | PERMITTED |
| ~ | ~ |
| 3000 | NOT PERMITTED |

| DIAL NUMBER | TRUNK CIRCUIT | MOBILE TERMINAL NUMBER | TELEPHONE SET (EFFECTIVE WHEN MOBILE TERMINAL NUMBER BEING NOT REGISTERED) |
|---|---|---|---|
| 123-7000 | CIRCUIT 1 | 1000 | 5000 |
| 123-8000 | CIRCUIT 2 | | 5000 |

600

RADIO SWITCHING EQUIPMENT PERMITTING A PLURALITY OF MOBILE TERMINALS TO USE ONE TRUNK CIRCUIT AND A CIRCUIT CONTROL METHOD FOR RADIO SWITCHING EQUIPMENT

BACKGROUND OF THE INVENTION

1. Field of the Invention

The present invention relates generally to radio switching equipment. More particularly, the invention relates to radio switching equipment controls enabling a plurality of mobile terminals to use one trunk circuit.

2. Description of the Related Art

Conventionally, radio switching equipment has been employed for connecting one mobile terminal with another mobile terminal to permit communication therebetween. Each trunk circuit and each mobile terminal are preliminarily matched on a one-to-one basis using office data as a parameter in the radio switching equipment. A call from the trunk circuit is received only by the mobile terminal which is preliminarily matched to the trunk circuit corresponding to the office data.

In the conventional radio switching equipment set forth above, it is not possible for an unmatched mobile terminal to receive a call from the above trunk. Accordingly, when the number of registered mobile terminals is greater than the number of trunk circuits, some mobile terminals cannot receive calls from all of the trunk circuits.

SUMMARY OF THE INVENTION

The first object of the present invention is to provide radio switching equipment, which avoids having a mobile terminal that cannot receive a call from a trunk circuit. The mobile terminal should be able to connect to the trunk circuit, even when the number of mobile terminals is greater than the number of the trunk circuits, in order to avoid the problem of the prior art.

The second object of the present invention is to provide radio switching equipment which permits the mobile terminal to receive a call from a desired trunk circuit and to call out with a desired trunk circuit.

The third object of the present invention is to provide a radio switching equipment which can permit the mobile terminal to vary the content of a circuit correspondence memory through operation from the mobile terminal. The content of the memory should be modified to dissociate the mobile terminal from the trunk circuit. In this instance, the call from the trunk circuit is not received by the mobile terminal (reject call reception).

According to the first aspect of the invention, a radio switching equipment comprises circuit correspondence storage means for storing a plurality of mobile terminal numbers with respective correspondence with a circuit number of each trunk circuit, circuit control means for reading out the mobile terminal number corresponding to the circuit number of the trunk circuit or reading out the circuit number of the trunk circuit corresponding to the mobile terminal number, on the basis of a storage content of the circuit correspondence storage means when a call is received from the trunk circuit or when call is made from the mobile terminal, and for requesting call processing, call processing means for receiving the call processing request from the circuit control means and establishing a connection between the mobile terminal identified by the mobile terminal number and the trunk circuit identified by the circuit number, and varying means for varying correspondence between the circuit number of the trunk circuit and the mobile terminal number of the mobile terminal through which a demand for variation is requested, in the circuit correspondence storage means, in response to the demand for variation from the mobile terminal.

In the preferred construction, the circuit correspondence storage means stores correspondence between the circuit number of the trunk circuit and the mobile terminal number of the mobile terminal and an information indicating whether the mobile terminal is permitted variation of the storage content of the circuit correspondence storage means, and receives only a demand for variation from the mobile terminal which is permitted variation on the basis of the circuit correspondence storage means and performs variation of the storage content of the circuit correspondence storage means.

In another preferred construction, the mobile terminal issues the variation demand by sending a special number designated by the circuit number of the trunk circuit corresponding to the mobile terminal number of the mobile terminal.

In another preferred construction, the circuit correspondence storage means stores correspondence between the circuit number of each trunk circuit and the mobile terminal number of the mobile terminal and whether the mobile terminal is permitted to vary the storage content of the circuit correspondence storage means, the mobile terminal performs the variation demand by transmitting a special number designating the circuit number of the trunk circuit corresponding to the mobile terminal number of the mobile terminal; and the varying means performs variation of the storage content of the circuit correspondence storage circuit receiving only variation demand from the mobile terminal which is permitted to vary, on the basis of the circuit correspondence storage means.

In another preferred construction, the mobile terminal establishes correspondence of the mobile terminal number of own mobile terminal with any one of the circuit numbers of the trunk circuits, or delete the correspondence between the circuit number of the trunk circuit and the mobile terminal number of the own mobile terminal, the varying means establishes correspondence between the circuit number of the trunk circuit and the mobile terminal number and the mobile terminal number of the mobile terminal or deletes correspondence between the circuit number of the trunk circuit and the mobile terminal number and the mobile terminal number of the mobile terminal.

In another preferred construction, in the circuit correspondence storage means, a correspondence between the circuit number of the trunk circuit and the mobile terminal number of the mobile terminal is stored together with information about whether the mobile terminal is permitted to vary the storage content of the circuit correspondence storage means or not, the mobile terminal establishes correspondence for the mobile terminal number of its own mobile terminal to any one of the circuit numbers of the trunk circuit and deletes correspondence between the circuit number of its trunk circuit and the mobile terminal number of its own mobile terminal by transmitting a special number designating the circuit number of the trunk circuit corresponding to the mobile terminal number of its own mobile terminal, and the varying means receives the variation demand only from the mobile terminal which is permitted to vary on the basis of the circuit correspondence storage means, establishes correspondence between the circuit number of the trunk circuit and the mobile terminal number of the mobile terminal or deletes correspondence between the circuit number of the trunk circuit and the mobile terminal number of the mobile terminal as demanded on the basis of the variation demand.

According to the second aspect of the invention, a circuit control method in a radio switching equipment comprising the steps of storing a plurality of mobile terminal numbers with correspondence with a circuit number of each trunk circuit in circuit correspondence storage means, varying the correspondence between the circuit number of the trunk circuit and the mobile terminal number of the mobile terminal which issues a variation demand, stored in the circuit correspondence storage means, in response to the variation demand from the mobile terminal.

In the preferred construction, the correspondence between the circuit number of each trunk circuit and the mobile terminal number of the mobile terminal and an information whether the mobile terminal is permitted to vary the storage content of the circuit correspondence storage means are stored in the circuit correspondence storage means, and variation of the storage content of the circuit correspondence storage means is performed by receiving the variation demand only from the mobile terminal which is permitted to vary the storage content of the circuit correspondence storage means.

In another preferred construction, the mobile terminal issues the variation demand by transmitting a special number designating the circuit number of the trunk circuit corresponding to the mobile terminal number of the mobile terminal.

In another preferred construction, the correspondence between the circuit number of each trunk circuit and the mobile terminal number of the mobile terminal and an information whether the mobile terminal is permitted to vary the storage content of the circuit correspondence storage means are stored in the circuit correspondence storage means, the mobile terminal issues the variation demand by transmitting a special number designating the circuit number of the trunk circuit corresponding to the mobile terminal number of the mobile terminal, and variation of the storage content of the circuit correspondence storage means is performed by receiving the variation demand only from the mobile terminal which is permitted to vary the storage content of the circuit correspondence storage means.

In another preferred construction, the mobile terminal issues the variation demand for establishing correspondence between the mobile terminal number of the mobile terminal and any one of the circuit numbers of the trunk circuits or deleting correspondence between the mobile terminal number of the mobile terminal and any one of the circuit numbers of the trunk circuits, and on the basis of the variation demand, the correspondence is established between the mobile terminal number of the mobile terminal and any one of the circuit numbers of the trunk circuits or the correspondence is deleted between the mobile terminal number of the mobile terminal and any one of the circuit numbers of the trunk circuits, as demanded.

In another preferred construction, the correspondence between the circuit number of each trunk circuit and the mobile terminal number of the mobile terminal and an information whether the mobile terminal is permitted to vary the storage content of the circuit correspondence storage means are stored in the circuit correspondence storage means, the mobile terminal establishes correspondence between the mobile terminal number of the mobile terminal and any one of the circuit numbers of the trunk circuits or deletes correspondence between the mobile terminal number of the mobile terminal and any one of the circuit numbers of the trunk circuits by transmitting a special number designating the circuit number of the trunk circuit corresponding to the mobile terminal number of the mobile terminal, and correspondence is established between the mobile terminal number of the mobile terminal and any one of the circuit numbers of the trunk circuits or the correspondence is deleted between the mobile terminal number of the mobile terminal and any one of the circuit numbers of the trunk circuits on the basis of a variation demand by receiving the variation demand from the mobile terminal which is permitted to vary the storage content of the circuit correspondence storage means, on the basis of the circuit correspondence storage means.

According to another aspect of the invention, a computer readable memory stores a circuit control program performing circuit control in radio switching equipment, the circuit control program comprising the steps of storing a plurality of mobile terminal numbers that correspond with a circuit number of each trunk circuit in a circuit correspondence storage means, varying the correspondence between the circuit number of the trunk circuit and the mobile terminal number of the mobile terminal which issues the variation demand, the correspondence stored in the circuit correspondence storage means, in response to the variation demand from the mobile terminal.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail to avoid unnecessarily obscuring the present invention.

Figure 1:
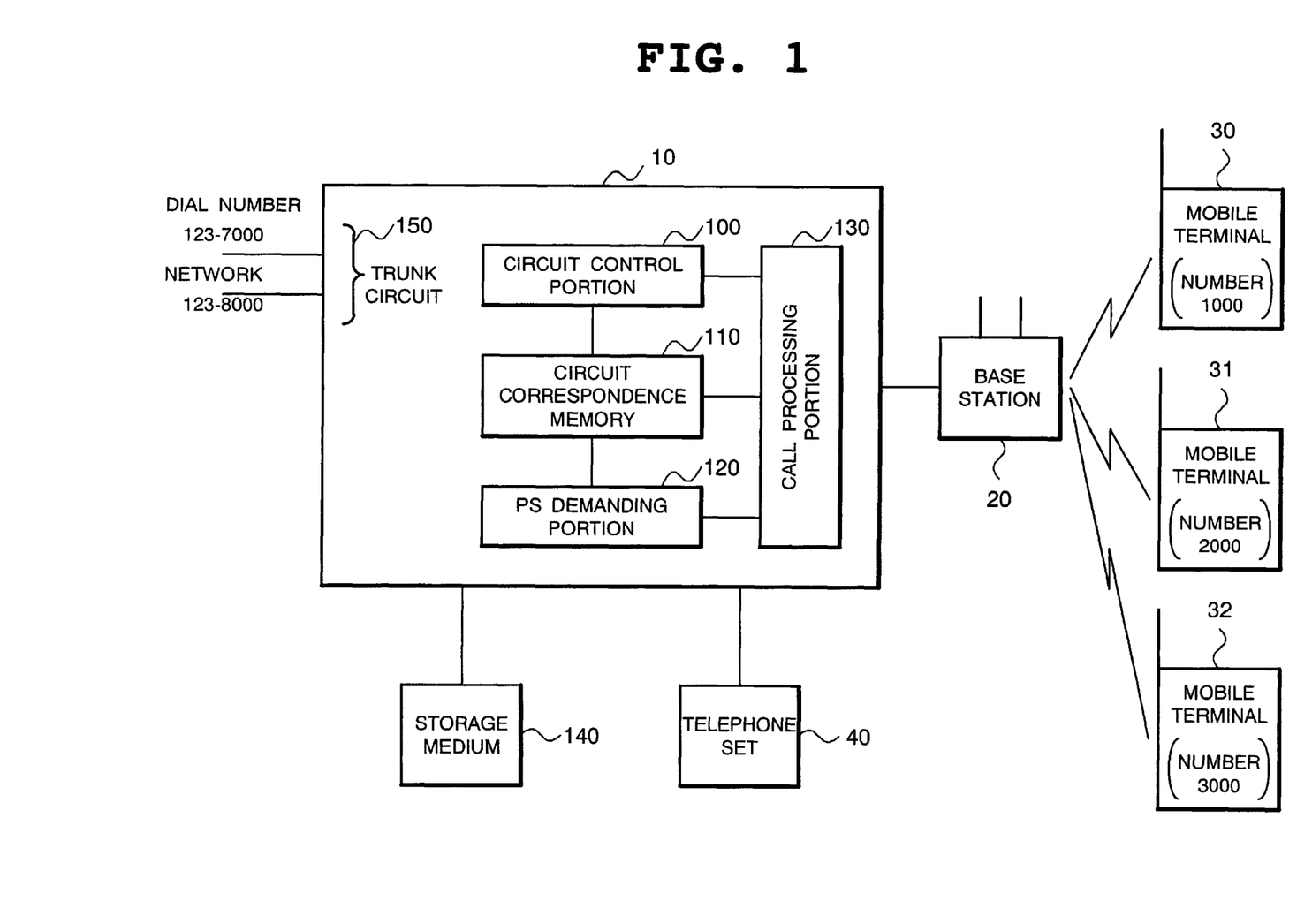
FIG. 1 is a block diagram showing a construction of the preferred embodiment of radio switching equipment according to the present invention.

FIG. 1 is a block diagram showing a preferred embodiment of radio switching equipment according to the present invention.

Radio switching equipment 10 includes a circuit correspondence memory 110, a circuit control portion 100, a PS demand portion 120 and a call processing portion 130, as shown in FIG. 1.

The circuit correspondence memory 110 stores a plurality of mobile terminal numbers which correspond to circuit numbers in trunk circuit 150.

The circuit control portion 100 is responsive to calls from the trunk circuit 150. The circuit control portion 100 reads mobile terminal numbers corresponding to the circuit number from the trunk circuit 150 from which the call is received. The correspondence between the mobile terminal numbers and the circuit numbers is based on the content stored in the circuit correspondence memory 110. The circuit control portion 100 requests call processing from the call processing portion 130 once the mobile terminal numbers are established. The circuit control portion 100 is also responsive to calls from the mobile terminal and reads out the circuit number of the trunk circuit 150 corresponding to the mobile terminal number which makes a call. Again, the content of the circuit correspondence memory 110 is used to determine the circuit numbers and a request for call processing is made to the call processing portion 130.

The call processing portion 130 receives the request for call processing from the circuit control portion 100. The call processing portion 130 acts on the request to establish a connection between the mobile terminal identified by the mobile terminal number and the trunk circuit 150 identified by the circuit number. Once the call is completed communication is terminated and the call processing portion 130 executes call processing for cutting off the call connection.

The PS demand portion 120 modifies the content of the circuit correspondence memory 110 in response to a command from the mobile terminal.

A storage medium 140 (magnetic disk, a semiconductor memory or other storage medium) is connected to the radio switching equipment 10. A circuit control program stored in the storage medium 140 is loaded into the memory of a not shown computer within the radio switching equipment 10.

The computer is capable of realizing the above described functions.

In FIG. 1, there is shown a base station 20 connected to the radio switching equipment 10 and communicating with the corresponding mobile terminals. Radio switching equipment 10 provides a designation for a specific mobile terminal for transmitting commands. The base station 20 transmits and receives commands from the radio switching equipment 10. Mobile terminals 30 to 32 communicate with the base station 20 by radio transmission to receive commands from the radio switching equipment 10 and to transmit to the radio switching equipment 10. The reference numeral 40 denotes a telephone set which is connected to the radio switching equipment 10.

Figure 2:
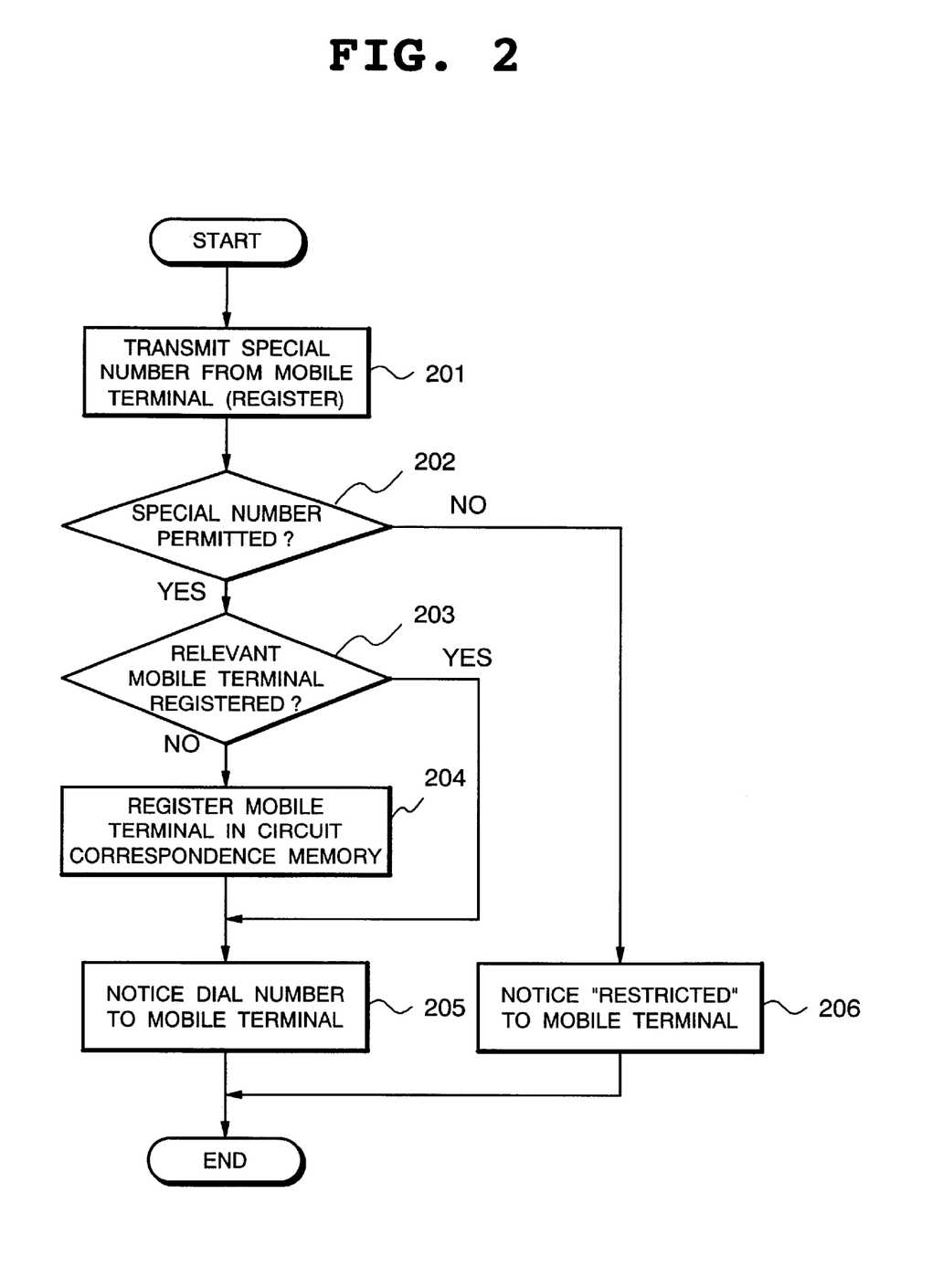
FIG. 2 is a flowchart for explaining a registration process of a mobile terminal to a circuit correspondence memory.
Figure 4:
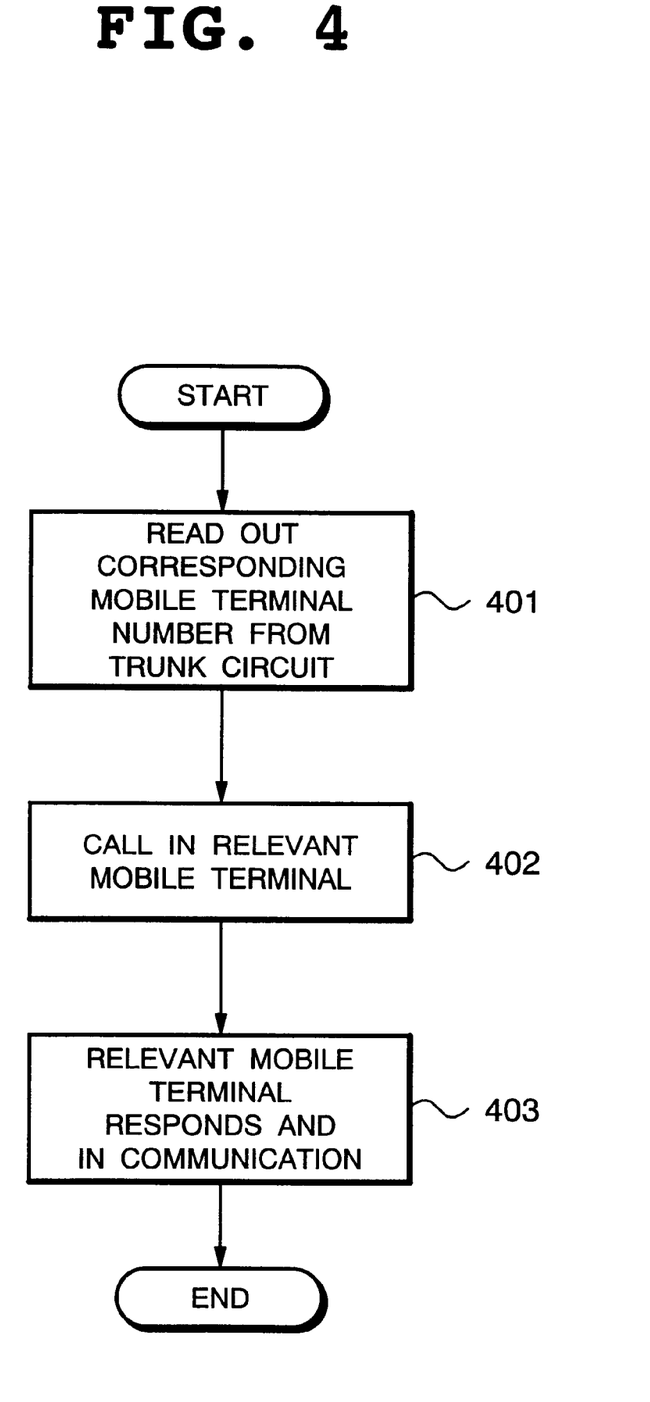
FIG. 4 is a flowchart for explaining a call reception process from a trunk circuit.
Figure 5:
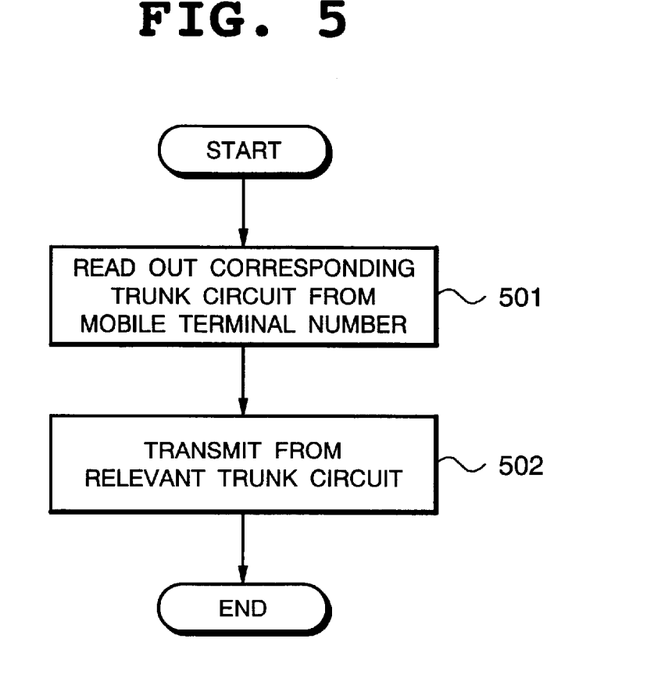
FIG. 5 is a flowchart for explaining a call out process to the trunk circuit from the mobile terminal.
Figure 6:
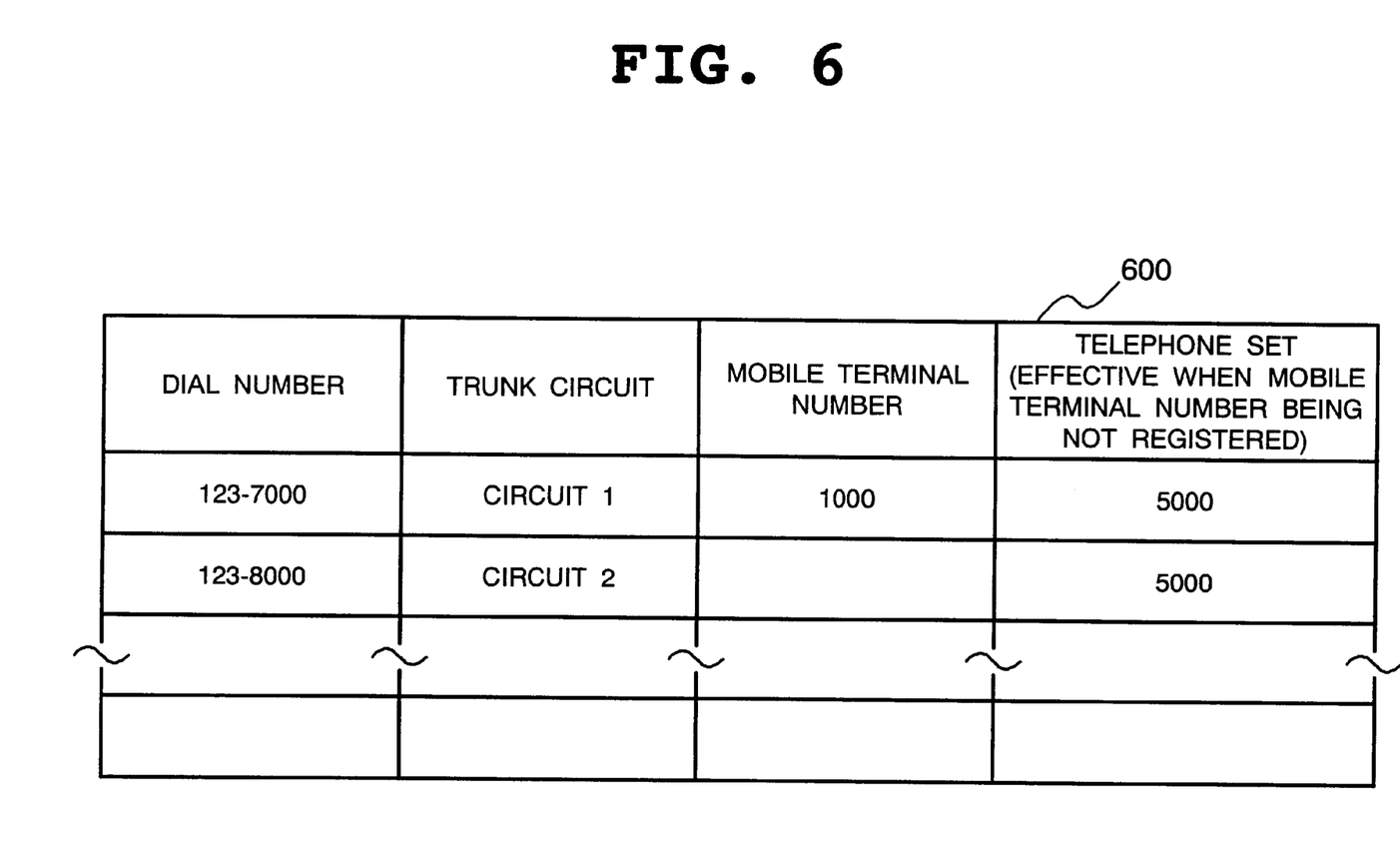
FIG. 6 is an illustration showing one example of a table structure establishing a correspondence between the mobile terminal and the trunk circuit.
Figure 7:
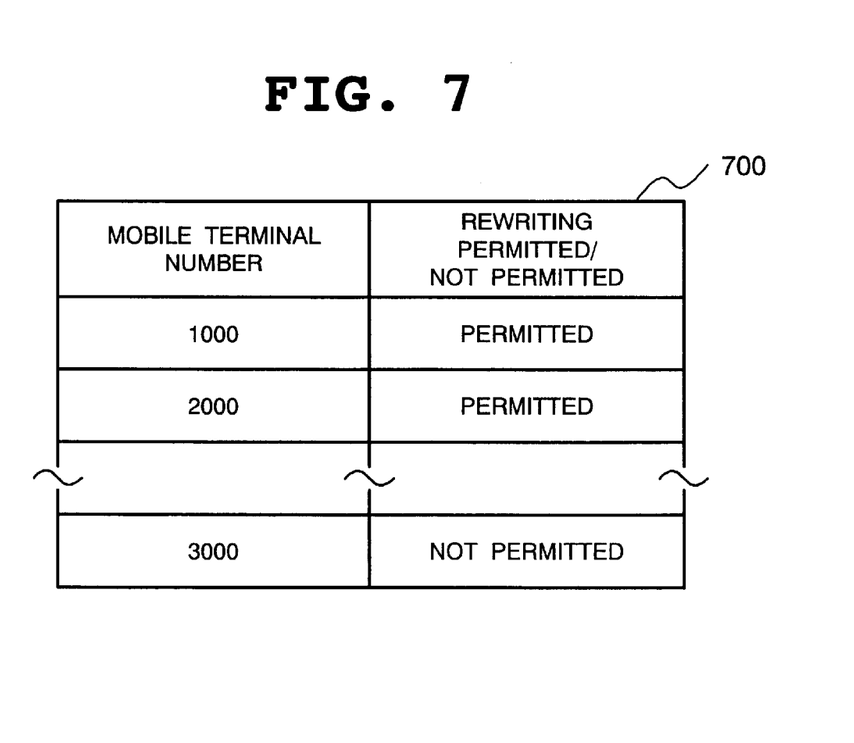
FIG. 7 is an illustration showing one example of a table structure designating the mobile terminals which can modify table shown in FIG. 6.

Referring now to FIGS. 2–7, registration of the mobile terminal to the circuit correspondence memory 110 is discussed. FIG. 2 is an illustration showing one example of a sequence for registration of the mobile terminal to the circuit correspondence memory 110. FIG. 6 shows an example of a table 600 referencing the mobile terminal and the trunk circuit. FIG. 7 shows an example of a table 700 specifying mobile terminals which can modify the table shown in FIG. 6.

For example, the mobile terminal 30 can have a mobile terminal number of "1000". A special registered number used when the mobile terminal 30 makes a call designates the circuit number of the trunk circuit 150. The special registered number (including a sign) represents a registration demand to the circuit correspondence memory 110. The call processing portion 130 receives the special number and the mobile terminal number "1000" via the base station 20. The PS demand portion 120 is notified of the demand (step 201).

The PS demanding portion 120 checks whether circuit correspondence memory 110 corresponding to the mobile terminal number "1000" is permitted based on the rewrite permission for mobile terminal number "1000" in the table 700. The call processing portion 130 makes the decision whether the entries can be rewritten based on tables 600, 700 (Step 202). If the entries may not be rewritten, the call processing portion 130 notifies the mobile terminal that the special number does not permit modification (Step 206).

In this example, rewriting information corresponding to the mobile terminal number "1000" is "possible". The table 600 shown in FIG. 6 is checked to determine whether the circuit number (e.g. No. 1) of the trunk circuit 150 is registered already. The circuit number is designated in the registered special number coupled with the mobile terminal number "1000". The circuit number demand comes from the call processing portion 130 and checks the circuit correspondence memory 110 (step 203).

Since the circuit number is registered in the example, the circuit number "1" and a corresponding dial number "123-7000" are returned to the call processing portion 130. The call processing portion 130 sends the dial number "123-7000" to the mobile terminal 30 via the base station 20 (step 205).

When the circuit number is not registered, no correspondence is returned in step 203, causing the mobile terminal number to be registered in the table 600 shown in FIG. 6. The corresponding circuit number of the trunk circuit 150 designated by the mobile terminal number is also registered with the registration special number (step 204).

Referring now to FIG. 4 an illustration of the sequence of call reception from the trunk circuit 150 is shown. As an example, a call from the trunk circuit 150 is received and contains a dial number.

The dial number "1123-7000" contained in the received call causes the circuit control portion 100 to retrieve the corresponding mobile terminal number from the table 600 shown in FIG. 6. Again, table 600 is located in the circuit correspondence memory 110. In this example, mobile terminal number 1000 corresponding to the mobile terminal 30, is retrieved (step 401). The mobile terminal number "1000" and the circuit number "1" of the trunk circuit 150 corresponding to the dial number "123-7000" are reported to the call processing portion 130. The call processing portion 130 establishes a connection between the circuit number "1" of the trunk circuit and the mobile terminal number "1000".

The mobile terminal 30 receives the call via the base station 20. A communication response from the mobile terminal 30 sets up the complete transmission. Once set up, the call goes through to the mobile terminal having the mobile terminal number "1000", and communication is permitted. (steps 402, 403).

Referring now to FIG. 5, an illustration of a sequence for calls from the mobile terminal to the trunk circuit is shown.

When a mobile terminal places a call to the network/switching equipment, the circuit control portion 100 receives the call. For example, the mobile terminal 30 places a call via the base station 20, which contacts the circuit control portion 100. The circuit control portion 100 retrieves and reads out the circuit number of the corresponding trunk circuit 150 from the table 600 shown in FIG. 6. The table 600 is located in the circuit correspondence memory 110. When presented with the mobile terminal number "1000" in this example, the circuit 1 corresponds to terminal number "1000", so circuit 1 is returned to the circuit control portion 100. (step 501).

The circuit control portion 100 conveys the circuit number "1" of the trunk circuit 150 and the terminal number "1000" of the mobile terminal 30 to the call processing portion 130. The call processing portion 130 establishes a connection between the trunk circuit 150 identified by the circuit number "1" and the mobile terminal identified by the mobile terminal number "1000" to enable communication from the mobile terminal 30 to the trunk circuit 150 of the circuit number "1" (step 502).

Figure 3:
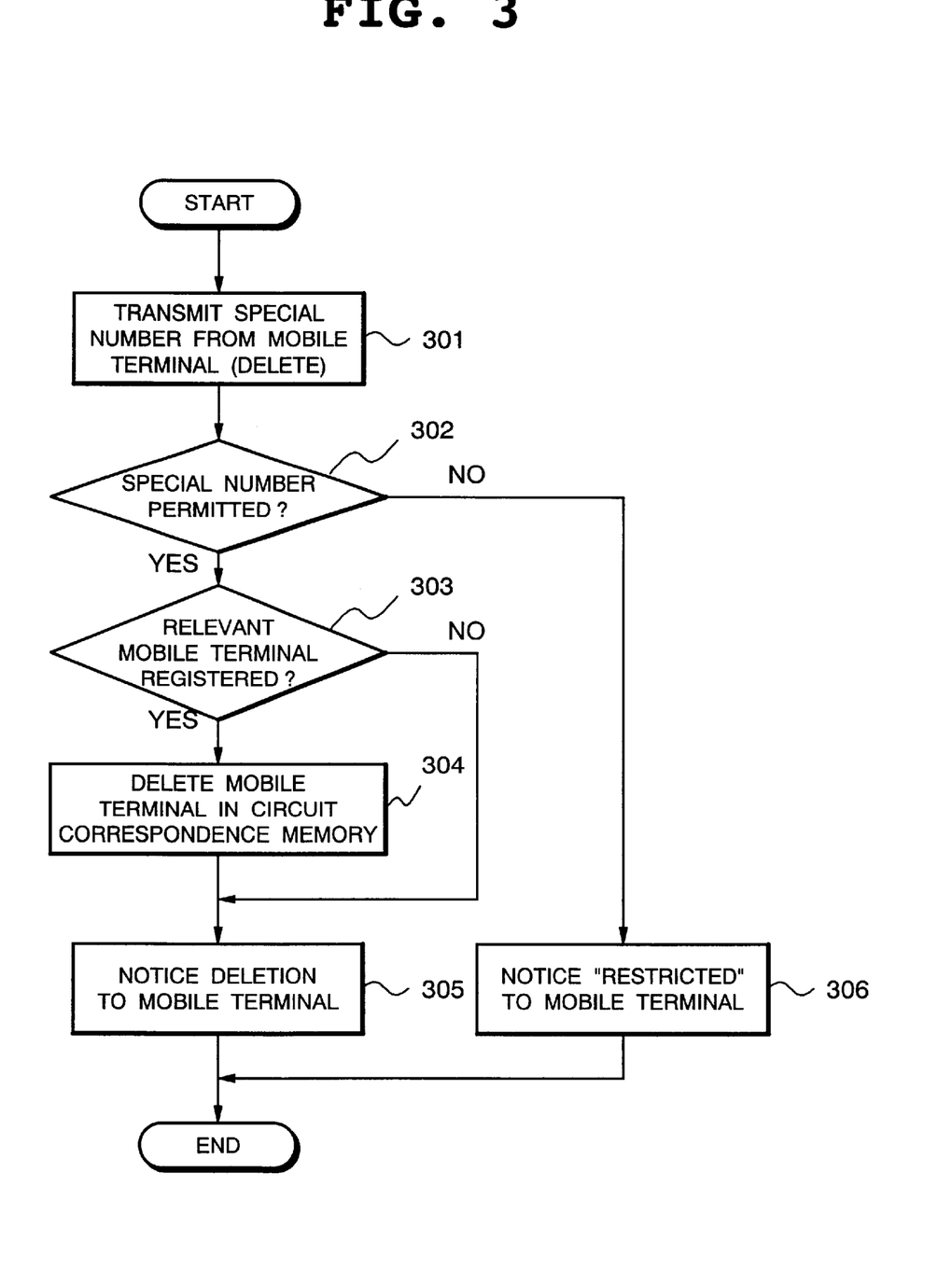
FIG. 3 is a flowchart for explaining a process for deleting a mobile terminal from the circuit correspondence memory.

Referring now to FIG. 3, an illustration of a sequence for deleting the mobile terminal from the circuit correspondence memory 110 is shown.

Deletion of the mobile terminal occurs, for example, when the mobile terminal 30 having a mobile terminal number "1000" places a call with a special number for deletion. The special number acts as a predetermined code (including signs) representative of a command for deletion of the mobile terminal from the circuit correspondence memory 110. This special number for deletion and the mobile terminal number "1000" are received via the call processing portion 130 and posted to the PS demanding portion 120 (step 301).

The PS demanding portion 120 checks the table 700 against the mobile terminal number to see whether the content of the table 600 can be rewritten. The table 600 is located in the circuit correspondence memory 110 and contains a reference for the mobile terminal number "1000" in the example. The table 700 shown in FIG. 7 is located in the circuit correspondence memory 110 (step 302).

In this case, rewriting corresponding to the mobile terminal number is "permitted", as shown in FIG. 7. A check is performed against the table 600 shown in FIG. 6 to determine whether the mobile terminal number "1000" is registered or not (step 303). In this case, the mobile terminal number "1000" is registered, and the registered mobile terminal number is deleted from the table 600 shown in FIG. 6 (step 304). The fact that the registered mobile terminal number "1000" is deleted is posted to the call processing portion 130. The call processing portion 130 submits notice of the deletion to the mobile terminal 30 via the base station 20 (step 305).

When the mobile terminal number is not registered at step 303, the process is advanced to step 305 without deleting the entry in the table 600.

When a call to the dial number "123-7000" is received after deletion, the call is not received by the mobile terminal 30 of the mobile terminal number "1000" and is received by the telephone set 40 instead (steps 401 and 402 of FIG. 4).

On the other hand, when another mobile terminal is registered to correspond dial number "123-7000", the mobile terminal can send and receive calls under the dial number "123-7000".

When a call is made that has a special number for registration or for deletion and no changes are permitted for the mobile terminal as referenced in table 600 shown in FIG. 6, the resulting operation is shown in FIGS. 2 and 3.

When the mobile terminal 32, for example, having mobile terminal number 3000, makes a call involving a special number code for registration or special number code for deletion, the special number and the mobile terminal number "3000" are sent via the base station 20 to the call processing portion 130. When the call processing portion 130 receives the special number and the mobile terminal number, the information is provided to the PS demanding portion 120 (step 201 and step 301).

The PS demanding portion 120 checks the table 700 to determine whether the content of the table 600 shown in FIG. 6 can be rewritten. Circuit correspondence memory 110 holds the tables 600, 700. The tables are checked for entries corresponding to the mobile terminal number "3000" (steps 202 and 302). In this example, rewriting the information corresponding to the mobile terminal number "3000" is "not permitted". This restriction on registration and deletion is relayed to the call processing portion 130. The call processing portion 130 posts the status on rewriting to the mobile terminal 30 via the base station 20 (steps 206 and 306).

The operation set forth above is achieved by a circuit control program preliminarily recorded on the storage medium 140. The circuit control program is loaded into the memory in the computer (not shown)in the radio switching equipment. The above operation is achieved by executing the circuit control program with the computer.

Figure 8:
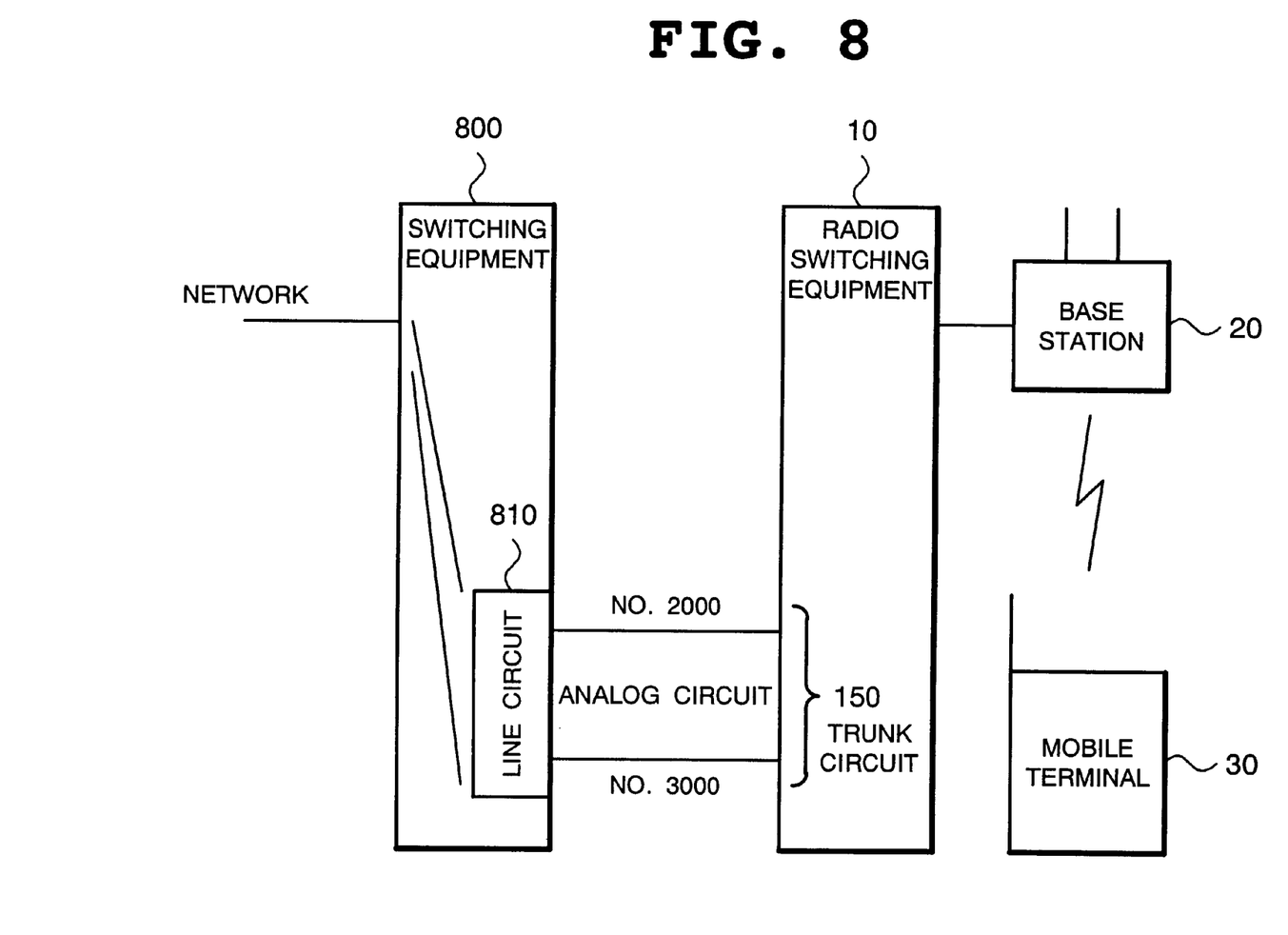
FIG. 8 is an illustration showing an example of a system in the case where the trunk circuit is connected with a line circuit of other switching equipment through an analog circuit.

In the foregoing discussion, the embodiment of the present invention has the trunk circuit 150 of the radio switching equipment 10 connected to the network, and call-out and call-in functions are performed through the network with the dial number. However, as shown in FIG. 8, the present invention is applicable for a system wherein the trunk circuit 150 of the radio switching equipment 10 is connected to a line circuit 810 of other switching equipment 800 through an analog circuit. In this case, the dial number of the table shown in the foregoing embodiment may be replaced with a number corresponding to respective analog circuits.

In FIG. 8,the mobile terminal 30 has a correspondence with the line circuit 810 of the switching equipment 800. The correspondence is set with office data on a one-to-one basis, and the mobile terminal 30 can be used as if it were connected directly to the switching equipment 800.

In the case set forth above, by applying the circuit control system according to the present invention, the number of mobile terminals 30 can be greater than or equal to the number of circuits between the line circuits 810 and the trunk circuits 150.

As set forth above, the content of the circuit correspondence memory 110 storing correspondences between a trunk circuit and mobile terminals, can be varied by operation from a mobile terminal. Thus, one trunk circuit can be used with a plurality of the mobile terminals. With this configuration, all of the mobile terminals are permitted to receive calls from the trunk circuit, even if the mobile terminals are registered in numbers greater than the trunk circuits.

The mobile terminal can be operated to permit registration in the circuit correspondence memory 110. The mobile terminal can be associated with the desired trunk circuit to receive calls and to make calls using the desired trunk circuit.

Furthermore, the mobile terminal can be disassociated with the trunk circuit by varying the content of the circuit correspondence memory. This disassociation can occur through operations at the mobile terminal. In this way, it becomes possible to prevent the mobile terminal from receiving a call from the trunk circuit (reject call reception).

Although the present invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above, but to include all possible embodiments within the scope encompassed by the invention and equivalents thereof with respect to the features set out in the appended claims.

What is claimed is:

1. A wireless communication switching system comprising:
   a memory storage effective to store a correspondence between a mobile terminal number and a trunk circuit number and further effective to store an indication of whether said correspondence is permitted to be modified;
   a memory storage control operable to access and vary said correspondence and further operable to retrieve at least one of said mobile terminal number and said trunk circuit number when a call is received from a respective trunk circuit or when a call is made from a respective mobile terminal, said memory storage control being further effective to request call processing;
   a call processor effective to receive said request for call processing from said memory storage control and establish a connection between said mobile terminal and said trunk circuit; and
   said memory storage control can receive demands to vary said correspondence from said mobile terminal and can permit or prevent variation of said correspondence based on said indication.

2. A wireless communication switching system as set forth in claim 1, wherein said mobile terminal can issue said demand to vary said correspondence by sending a special number related to said trunk circuit.

3. A wireless communication switching system as set forth in claim 2, wherein said mobile terminal is operable to request said correspondence between said mobile terminal number and said trunk circuit number be at least one of established, modified or deleted.

4. A wireless communication switching system as set forth in claim 1, wherein said mobile terminal is operable to request a correspondence between said mobile terminal number and said trunk circuit number be at least one of established, modified or deleted.

5. A circuit control method for a wireless switching device comprising:
   storing a correspondence between a mobile terminal number and a trunk circuit number;
   storing an indication of whether said correspondence is permitted to be modified;
   receiving a request from a mobile terminal to modify said correspondence; and
   modifying said correspondence according to said request if modification of said correspondence is permitted based on said indication.

6. A circuit control method for a wireless switching device as set forth in claim 5, further comprising transmitting from said mobile terminal a special number related to a trunk circuit to request modification of said correspondence.

7. A circuit control method for a wireless switching device as set forth in claim 6, wherein said request from said mobile terminal is effective to request said correspondence between said mobile terminal number and said trunk circuit number be at least one of established, modified or deleted.

8. A circuit control method for a wireless switching device as set forth in claim 5, wherein said request from said mobile terminal is effective to request said correspondence between said mobile terminal number and said trunk circuit number be at least one of established, modified or deleted.

9. A computer readable memory storing a circuit control program code executable to perform circuit control in a wireless switching device, said circuit control program code comprising:
   storing a correspondence between a mobile terminal number and a trunk circuit number;
   storing an indication of whether said correspondence is permitted to be modified;
   receiving a request from a mobile terminal to modify said correspondence; and
   modifying said correspondence according to said request if modification of said correspondence is permitted based on said indication.

10. A computer readable memory as set forth in claim 9, wherein said circuit control program code further comprises transmitting from said mobile terminal a special number related to a trunk circuit to request modification of said correspondence.

11. A computer readable memory as set forth in claim 10, wherein said request from said mobile terminal is effective to request said correspondence between said mobile terminal number and said trunk circuit number be at least one of established, modified or deleted.

12. A computer readable memory as set forth in claim 9, wherein said request from said mobile terminal is effective to request said correspondence between said mobile terminal number and said trunk circuit number be at least one of established, modified or deleted.

13. A wireless communication switching system, comprising:
   a memory storage effective to store a mobile terminal identifier related to a mobile terminal and a trunk circuit identifier related to a trunk circuit;
   said identifiers can be mapped and unmapped to each other, respectively, to permit or prevent a connection between said mobile terminal and said trunk circuit, respectively;

a processor operable to access said mobile terminal identifier and said trunk circuit identifier; and said processor being further operable to modify at least one of said identifiers effective to map or unmap said identifiers with respect to each other, whereby a connection between said mobile terminal and said trunk circuit can be permitted or prevented, respectively.

14. A wireless communication switching system as set forth in claim 13, further comprising a request from said mobile terminal to said processor to modify said at least one of said identifiers.

15. A wireless communication switching system as set forth in claim 14, wherein:

said request includes a special number; and said special number being effective to prompt said processor to modify said at least one of said identifiers, whereby a mapping between said identifiers is at least one of established, modified or deleted.

16. A wireless communication switching system as set forth in claim 13, further comprising an indication of whether said at least one of said identifiers is permitted to be modified.

17. A wireless communication switching system as set forth in claim 16, wherein said processor can receive a request to modify said at least one of said identifiers and can permit or prevent modification of said at least one of said identifiers based on said indication.

18. A wireless communication switching system as set forth in claim 17, wherein said request is received from said mobile terminal.

19. A wireless communication switching system as set forth in claim 18, wherein:

said request includes a special number; and said special number being effective to prompt said processor to modify said at least one of said identifiers, whereby a mapping between said identifiers is at least one of established, modified or deleted.

20. A wireless communication switching system as set forth in claim 13, further comprising a request received by said processor effective to solicit a modification of said at least one of said identifiers, whereby a mapping between said identifiers is at least one of established, modified or deleted.

21. A wireless communication switching system as set forth in claim 20, wherein said request is provided by said mobile terminal.

22. A wireless switching method, comprising:

storing a mobile terminal identifier related to a mobile terminal and a trunk circuit identifier related to a trunk circuit;

accessing said identifiers for modification to permit formation or elimination of a mapping between said identifiers effective to respectively permit or prevent a connection between said mobile terminal and said trunk circuit;

receiving a request to modify at least one of said identifiers effective to permit said formation or elimination of said mapping; and modifying said at least one of said identifiers in accordance with said request.

23. A wireless switching method as set forth in claim 22, further comprising storing an indication of whether said at least one of said identifiers is permitted to be modified.

24. A wireless switching method as set forth in claim 22, wherein said request is provided by said mobile terminal.

25. A wireless switching method as set forth in claim 24, wherein:

said request includes a special number; and said special number is effective to solicit modification of said at least one of said identifiers, whereby said mapping is at least one of established, modified or deleted.

26. A computer readable memory storing a program code executable to provide wireless switching, said program code comprising:

a first code segment executable to store a mobile terminal identifier related to a mobile terminal and a trunk circuit identifier related to a trunk circuit;

a second code segment executable to access said identifiers for modification to permit formation or elimination of a mapping between said identifiers effective to respectively permit or prevent a connection between said mobile terminal and said trunk circuit;

a third code segment executable to permit reception of a request to modify at least one of said identifiers effective to permit said formation or elimination of said mapping; and a fourth code segment executable to modify said at least one of said identifiers in accordance with said request.

* * * * *